United States Patent
Petrunya et al.

(10) Patent No.: US 10,819,622 B2
(45) Date of Patent: Oct. 27, 2020

(54) BATCH CHECKPOINTING FOR INTER-STREAM MESSAGING SYSTEM

(71) Applicant: LendingClub Corporation, San Francisco, CA (US)

(72) Inventors: Igor Petrunya, Pleasant Hill, CA (US); Dmitry Kondratenko, San Jose, CA (US); Prateek Demla, Concord, CA (US)

(73) Assignee: LendingClub Corporation, San Francisco, CA (US)

( * ) Notice: Subject to any disclaimer, the term of this patent is extended or adjusted under 35 U.S.C. 154(b) by 95 days.

(21) Appl. No.: 16/231,917

(22) Filed: Dec. 24, 2018

(65) Prior Publication Data

US 2020/0204482 A1 Jun. 25, 2020

(51) Int. Cl.
*H04L 12/703* (2013.01)
*H04L 12/26* (2006.01)
*H04L 12/24* (2006.01)

(52) U.S. Cl.
CPC .......... *H04L 45/28* (2013.01); *H04L 41/0654* (2013.01); *H04L 43/10* (2013.01)

(58) Field of Classification Search
CPC ..... H04L 41/0654; H04L 43/10; H04L 45/28; G06F 9/546
See application file for complete search history.

(56) References Cited

U.S. PATENT DOCUMENTS

| | | | |
|---|---|---|---|
| 7,590,898 B2 * | 9/2009 | Coekaerts | G06F 11/0709 709/223 |
| 10,140,318 B1 | 11/2018 | Prilutsky | |
| 2020/0151006 A1 * | 5/2020 | Kancharla | G06F 9/546 |
| 2020/0201694 A1 | 6/2020 | Petrunya | |

OTHER PUBLICATIONS

What is Amazon Kinesis Data Streams?, Dated Feb. 19, 2019, https://docs.aws.amazon.com/streams/latest/dev/introduction.html, 3 pages.

(Continued)

*Primary Examiner* — Rhonda L Murphy
(74) *Attorney, Agent, or Firm* — Hickman Palermo Becker Bingham LLP

(57) ABSTRACT

Embodiments facilitate efficient recovery from an inter-stream messaging system failure by using heartbeat messages (HMs) to act as watermarks for message recovery. Embodiments insert HMs into each of the input streams at configurable regular intervals. The inter-stream router determines that a message being routed is a HM, and corresponding output HMs are generated based on the input HM. Embodiments insert a respective output HM into each of the output streams. Information indicating which output HMs have been processed from the output streams is tracked. After a failure of the inter-stream router, embodiments identify a target HM for each input stream, which is the latest HM sourced from the respective input stream that was processed from all of the output streams. After the inter-stream router restarts, the router initiates message routing, from each input stream, at the location of the respective input stream's target HM within the input stream.

18 Claims, 9 Drawing Sheets

(56) References Cited

OTHER PUBLICATIONS

Apache Kafka, "Documentation", https://kafka.apache.org/documentation/#producerapi, dated Feb. 19, 2019, 223 pages.
Amazon Kinesis Data Streams, "Kinesis Data Streams Limits", dated Feb. 19, 2019, https://docs.aws.amazon.com/streams/latest/dev/service-sizes-and-limits.html, 2 pages.
"The Socket API", https://www.ibm.com/support/knowledgecenter/en/SSLTBW_2.3.0/com.ibm.zos.v2r3.hali001/thesocketapi.htm, 3 pages.
Thompson et al., "LMAX, Disruptor:, High Performance Alternative to Bounded Queues for Exchanging Data Between Concurrent Threads", dated May 2011, 11 pages.
Kondratenko, U.S. Appl. No. 16/231,921, filed Dec. 24, 2018, Notice of Allowance, dated Feb. 12, 2020.

* cited by examiner

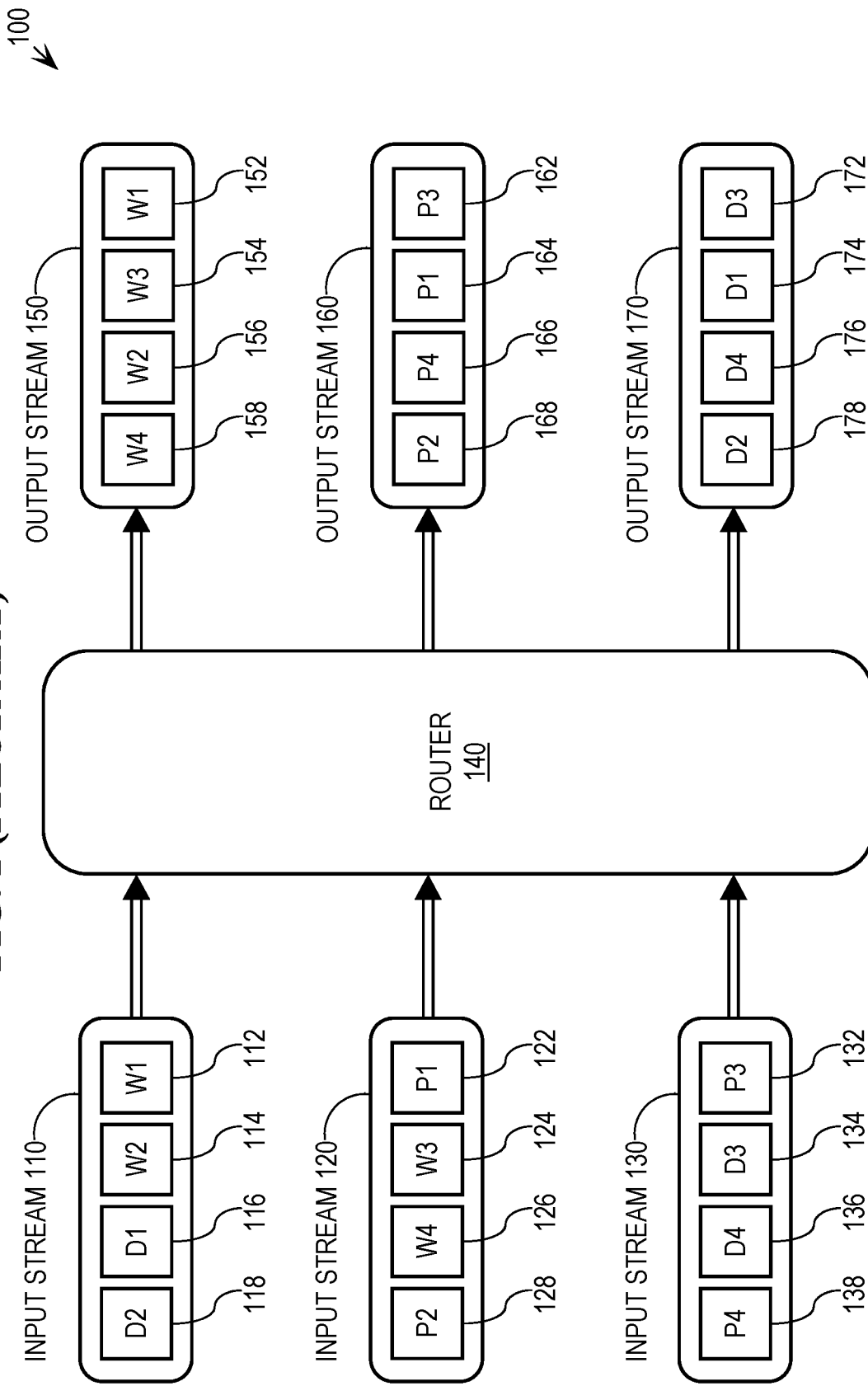

202
AN INTER-STREAM ROUTER DETECTING AN INPUT HEARTBEAT EVENT IN A PARTICULAR INPUT STREAM THAT INCLUDES AN ORDERED SET OF EVENTS, WHERE THE INTER-STREAM ROUTER ROUTES EVENTS FROM A PLURALITY OF INPUT STREAMS TO A PLURALITY OF OUTPUT STREAMS, AND WHERE THE PLURALITY OF INPUT STREAMS COMPRISES THE PARTICULAR INPUT STREAM

204
IN RESPONSE TO DETECTING THE INPUT HEARTBEAT EVENT, THE INTER-STREAM ROUTER AUTOMATICALLY SENDING A RESPECTIVE OUTPUT HEARTBEAT EVENT, THAT CORRESPONDS TO THE INPUT HEARTBEAT EVENT, TO EACH OUTPUT STREAM OF THE PLURALITY OF OUTPUT STREAMS

206
DETERMINING THAT A PARTICULAR OUTPUT HEARTBEAT EVENT, THAT CORRESPONDS TO THE INPUT HEARTBEAT EVENT, WAS PROCESSED FROM A PARTICULAR OUTPUT STREAM OF THE PLURALITY OF OUTPUT STREAMS

208
IN RESPONSE TO DETERMINING THAT THE PARTICULAR OUTPUT HEARTBEAT EVENT WAS PROCESSED FROM THE PARTICULAR OUTPUT STREAM, RECORDING, IN A HEARTBEAT STORE, INFORMATION FROM THE PARTICULAR OUTPUT HEARTBEAT EVENT IN CONNECTION WITH THE PARTICULAR OUTPUT STREAM

210
SELECTING A TARGET INPUT HEARTBEAT EVENT BASED ON INFORMATION IN THE HEARTBEAT STORE

212
AUTOMATICALLY RECOVERING EVENTS, FROM THE PARTICULAR INPUT STREAM, THAT ARE AFTER THE TARGET INPUT HEARTBEAT EVENT IN THE ORDERED SET OF EVENTS

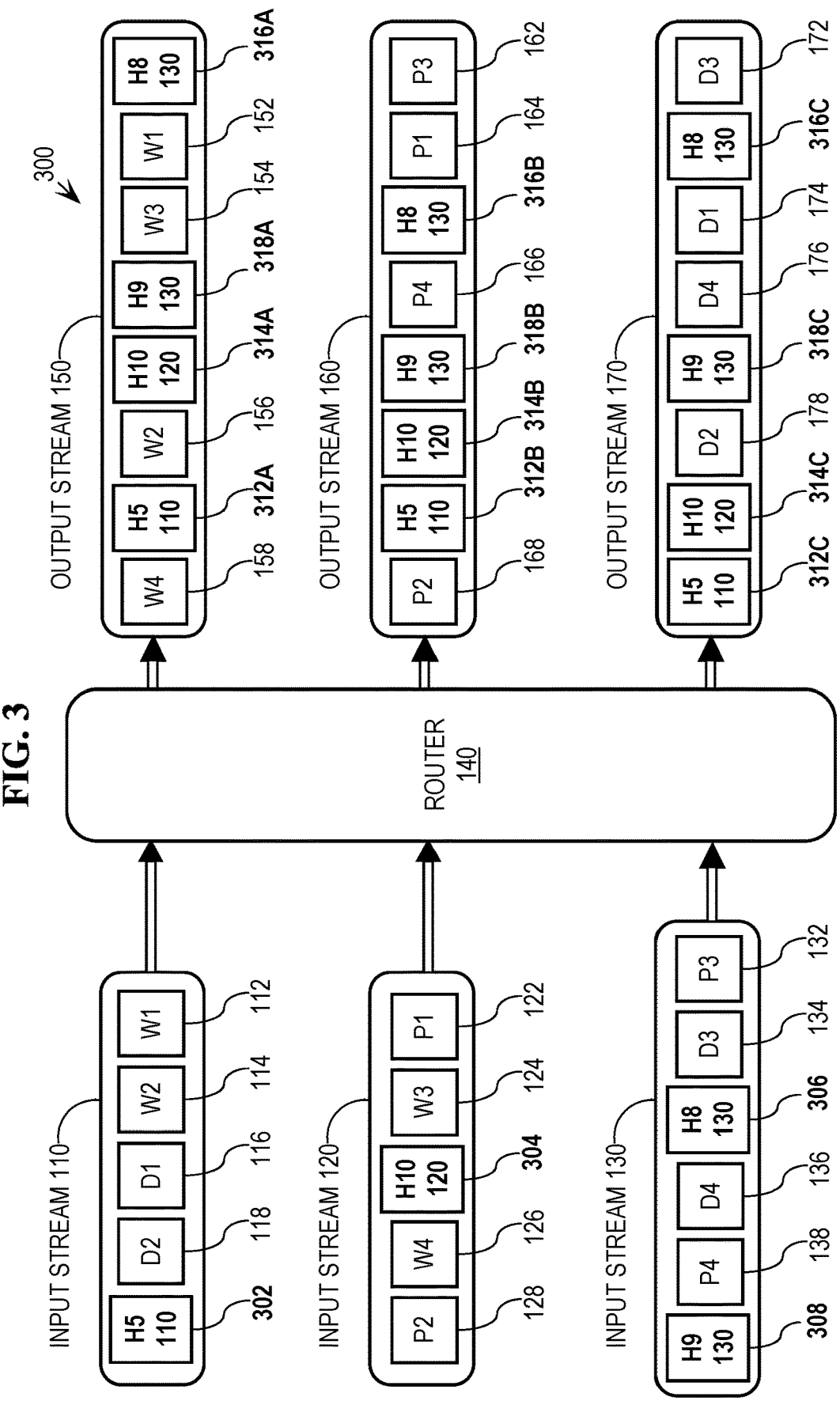

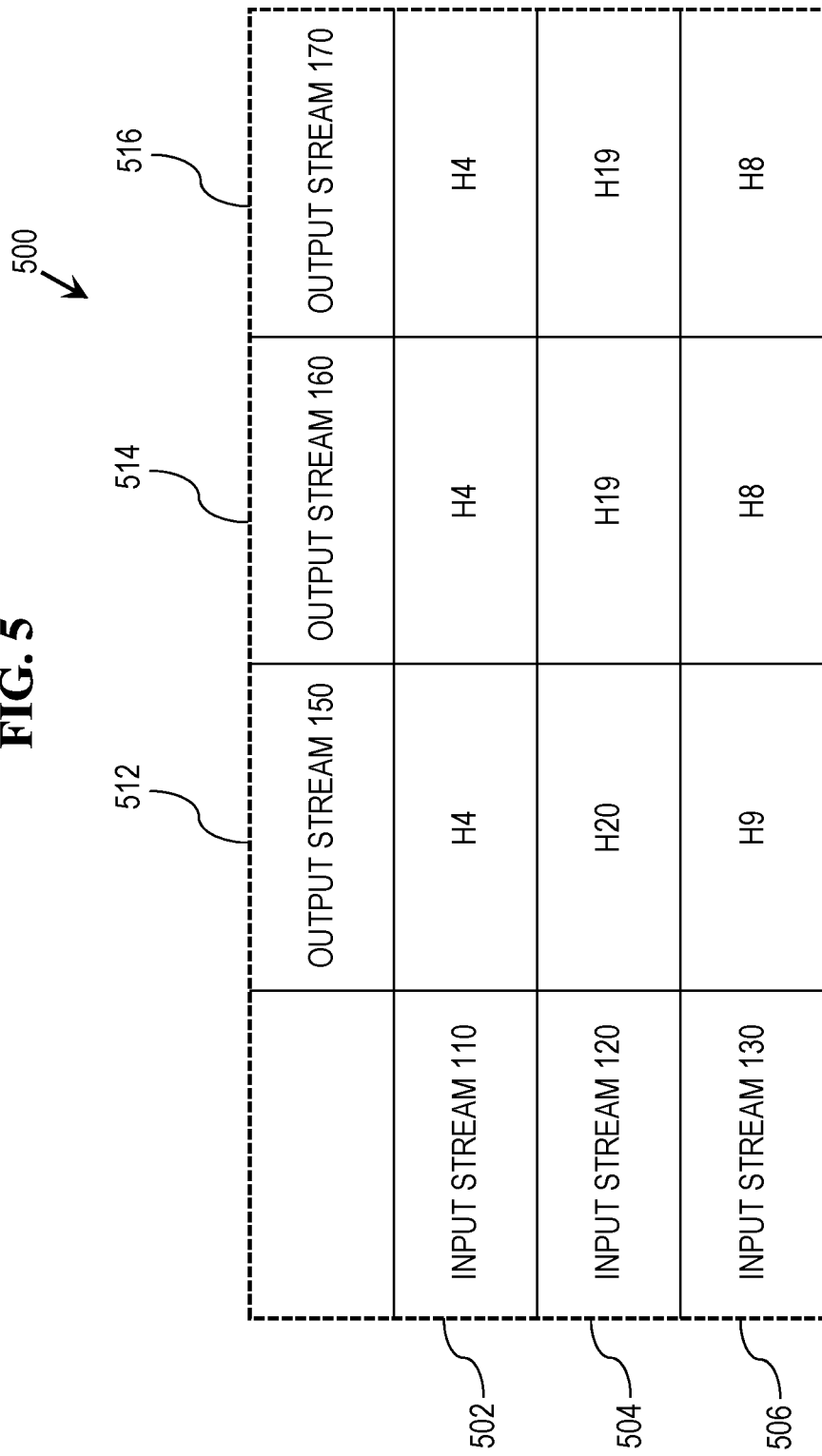

FIG. 6

602 — FORM AN OUTPUT ARRAY OF MESSAGES FROM MESSAGES RECEIVED FROM A PLURALITY OF INPUT STREAMS, WHERE THE OUTPUT ARRAY IS FOR A PARTICULAR OUTPUT STREAM AND INCLUDES MESSAGES FROM THE PLURALITY OF INPUT STREAMS THAT MATCH CRITERIA ASSOCIATED WITH THE PARTICULAR OUTPUT STREAM, WHERE THE OUTPUT ARRAY INCLUDES MULTIPLE MESSAGES FROM EACH INPUT STREAM OF THE PLURALITY OF INPUT STREAMS, WHERE, WITHIN EACH INPUT STREAM OF THE PLURALITY OF INPUT STREAMS, THE MESSAGES ARE ORDERED, WHERE THE OUTPUT ARRAY IS FORMED IN A MANNER THAT PRESERVES THE ORDERING OF THE MESSAGES WITH RESPECT TO THE RESPECTIVE ORDERING OF EACH OF THE PLURALITY OF INPUT STREAMS

604 — ADD MESSAGES FROM A HEAD OF THE OUTPUT ARRAY TO A BATCH UNTIL ADDITION OF A NEXT MESSAGE IN THE OUTPUT ARRAY TO THE BATCH WOULD VIOLATE A PARTICULAR BATCH PROCESSING CONSTRAINT

606 — PROCESS THE BATCH AS PART OF THE PARTICULAR OUTPUT STREAM

BATCH CHECKPOINTING FOR INTER-STREAM MESSAGING SYSTEM

CROSS-REFERENCE TO RELATED APPLICATIONS

This application is related to the U.S. application Ser. No. 16/231,921, filed Dec. 24, 2018, titled "Message Stream Processor Microbatching", now U.S. Pat. No. 10,628,242, issued Apr. 21, 2020.

FIELD OF THE INVENTION

The present invention relates to inter-stream message routing and, more specifically, to efficiently recovering from failures when messages are batch-routed from multiple incoming streams to multiple outgoing streams.

BACKGROUND

Inter-stream messaging systems, such as those implemented by a Disruptor message router, route messages from one or more input streams to one or more output streams. "Disruptor: High performance alternative to bounded queues for exchanging data between concurrent threads" by Thompson, et al., published May 2011 provides information about the Disruptor router, and is incorporated by reference as if fully set forth herein.

Many times, the messages being routed by an inter-stream messaging system represent events that have been produced by one or more producers. The event-representing messages are added to the input streams by the producers, and are to be processed by one or more consumers that process messages from the output streams. The inter-stream router of such a system routes any given message from an given input stream to one or more of the output streams based on routing criteria for the system. In the case of a Disruptor-implemented inter-stream messaging system, input streams are implemented as partitions of a ring buffer used by the Disruptor router to store messages, and consumers read the messages from the ring buffer partitions.

FIG. 1 depicts an example inter-stream messaging system 100 in which a router application 140 routes messages from a set of input streams 110, 120, and 130 to a set of output streams 150, 160, and 170 based on known routing/mixing criteria. In this example system, each input stream is associated with a message producer, and stores event-representing messages from the associated producer. The input streams may be populated by their respective producers at different rates, depending on the functionality of the producers populating those streams.

According to the routing criteria for the example system, router 140 sorts incoming messages by type, and assigns all messages with a given type to an output stream that is associated with that type. In the depiction of FIG. 1, input streams 110-130 include a set of messages, and output streams 150-170 show the same set of messages having been routed to the various output streams by router 140. For example, input stream 110 includes two withdrawal-type messages 112 and 114, and two deposit-type messages 116 and 118, which were created in response to operations performed by a particular user of the system with which input stream 110 is associated. The messages in input stream 110 are ordered from least-recently generated (message 112) to most-recently generated (message 118).

Output stream 150 is associated with withdrawal-type messages and output stream 170 is associated with deposit-type messages. When routing the messages from input stream 110, router 140 sends messages 112 and 114, in that order, to output stream 150 for processing (see corresponding messages 152 and 156). Router 140 also sends messages 116 and 118, in that order, to output stream 170 for processing (see corresponding messages 174 and 178). In this way, FIG. 1 depicts the functionality of router 140 for a given set of messages.

Some systems require strict ordering of routed messages. To illustrate, it shall be assumed that system 100 is part of a financial system, in which the relative ordering of messages in the input streams must be preserved in the output streams. A financial system is merely one of a virtually unlimited number of types of systems in which the techniques described herein may be used, and the invention is not limited to any particular type of system.

Preserving input ordering of the messages in the output ordering ensures that messages are able to be processed from the output streams in order of message generation, such that the withdrawals, deposits, balance checks, etc., represented by the messages, are processed in order. Thus, the ordering of messages in the input streams of FIG. 1 is preserved in the output streams. For example, message 112 ("W1") was input into stream 110 before message 114 ("W2"). Accordingly, in output stream 150, message 152 that corresponds to input message 112 is ordered before message 156 that corresponds to input message 114.

A first message is located "before" a second message in a given stream when the first message is closer to a head of the stream than the second message. Conversely, the second message is located "after" the first message in the stream because the second message is closer to a tail of the stream than the first message. The head of a message stream (or the head of a structure in which messages from the stream are stored) is the portion of the stream with the least-recently inserted messages, and the tail of the stream (or structure) is the portion of the stream with the most-recently inserted messages. To illustrate in the case of output stream 150 in FIG. 1, message 152 is at the head of the stream and message 158 is at the tail of the stream.

Many times, an inter-stream messaging system processes routed messages in batches. Processing messages from an output stream may comprise any kind of processing that logically removes the messages from the stream, such as publishing the messages to a consumer service that takes action based on the messages. When an inter-stream router processes messages in batches, there are times when one or more messages, having been routed to output streams, are not yet processed.

Recovering from router failure scenarios requires determining which messages had been routed but had not yet been processed prior to failure. Efficiently recovering can be difficult. The difficulty in recovering from such a router failure is compounded by the fact that any message can flow to any output stream from any input stream in an inter-stream message system. Thus, there is a possibility of losing messages when the inter-stream router goes down.

One way to facilitate failure recovery of a router failure is to require the inter-stream messaging system to persist, to a persistent store, the entire state of the system including records of messages that have been routed to output streams. However, this solution is inefficient because it requires a significant amount of storage capacity to store the state information, and it takes time and resources to keep a persisted system state up-to-date. Furthermore, the recovery procedure that is based on the persisted state requires expensive querying all of the stored message records, and then finding the messages with minimum/maximum timestamp.

Specifically, in order to perform recovery, generally all stored messages are read from the persisted system state, and the system identifies a minimum timestamp for a particular attribute (such as creation time) across all persisted messages. Messages at the identified minimum timestamp become the starting place for recovery of reading/publishing messages. As discussed above, this process is expensive both in the amount of storage needed and the amount of processing power needed to accomplish recovery. Thus, recovering from an inter-stream router failure based on a stored state of the system is both costly and inefficient.

As such, it would be beneficial to facilitate efficient recovery of an inter-stream messaging system suffering from a router failure, which recovers lost messages while requiring little storage space and low maintenance costs.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

BRIEF DESCRIPTION OF THE DRAWINGS

In the drawings:

FIG. 1 depicts an inter-stream messaging system, including a plurality of input and output message streams.

FIG. 2 depicts a flowchart for using heartbeat messages in input streams of an inter-stream messaging system to act as watermarks for recovery of messages from a set of output streams after a router failure.

FIG. 3 depicts an inter-stream messaging system that includes heartbeat messages in the plurality of input and output message streams.

FIG. 5 depicts an example heartbeat store that records the heartbeat messages, originating from each input stream, that have been processed from the output streams.

FIG. 6 depicts a flowchart for batching messages in order to efficiently satisfy batch processing constraints as well as message ordering requirements.

FIG. 7B further depicts candidate sets of messages.

DETAILED DESCRIPTION

Figure 4:
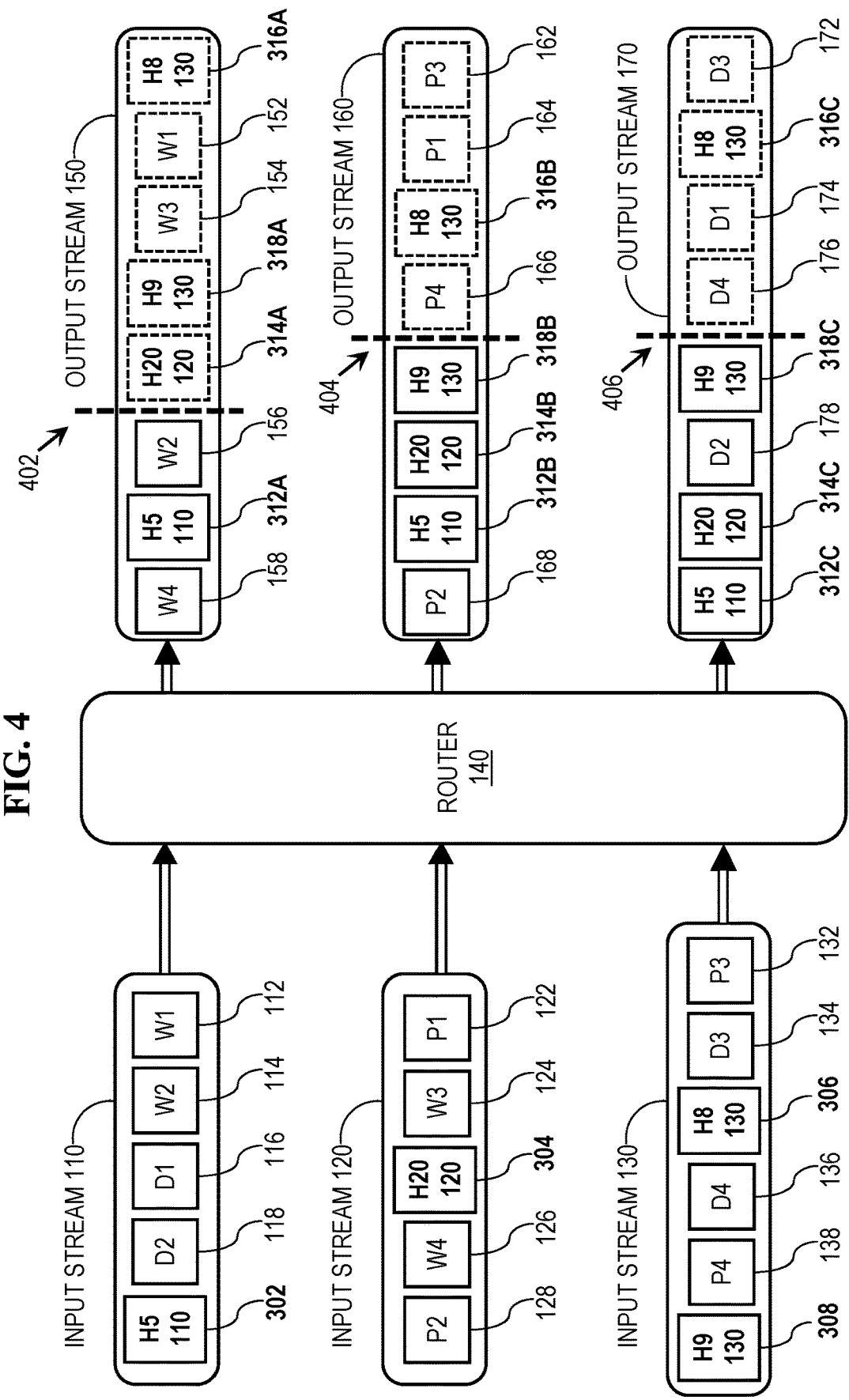
FIG. 4 depicts batches of messages that have been identified for each of the plurality of output streams.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Embodiments facilitate efficient recovery from an inter-stream messaging system failure by using heartbeat messages in input and output streams of the system to act as watermarks for recovery operations. Embodiments accommodate the various speeds at which producers insert messages into the input streams and consumers consume messages from the output streams by identifying an accurate time slice for recovery using the heartbeat message watermarks, which guarantees no loss of messages upon system failure.

Specifically, embodiments insert heartbeat messages into each of the input streams of the inter-stream messaging system at configurable regular intervals. When the inter-stream router encounters a heartbeat message, an output heartbeat message is (a) generated for each output stream based on the input heartbeat message, and (b) inserted into each of the output streams.

A "heartbeat store" is used to store information indicating which output heartbeat messages have been processed from the output streams. After a failure of the router of the inter-stream messaging system, embodiments identify a "target heartbeat message" for each input stream. The "target heartbeat message" of an input stream is the latest heartbeat message from the respective input stream that was processed from all of the output streams.

For example, assume that heartbeat messages A, B and C have been added to input stream 1. Further assume that the heartbeat store indicates that all output streams have processed messages A and B, but only some of the output streams have processed message C. In this example, heartbeat message B would be the target heartbeat message for input stream 1, since it is the most recent heartbeat from stream 1 that was processed by all output streams.

The target heartbeat message for a given input stream identifies a point in the input stream before which all messages have been processed. Thus, after the inter-stream router restarts, the router initiates message routing, from each input stream, at the location of the respective input stream's target heartbeat message within the input stream. In the present example, after failure of the inter-stream router, message routing for stream 1 would begin after heartbeat message B.

This system of inter-stream router failure recovery is very efficient because no querying of messages is required to determine at what location, within the input streams, the router should initiate message routing after restart. Furthermore, the tracking information required to identify target heartbeat messages for the input streams is stored in a very small data structure that is $O(N \times M)$, where N is the number of input streams and M is the number of output streams in the system. The size of this data structure is predictable as it is not affected by the volume of data moving through the individual streams.

Furthermore, because the frequency with which heartbeat messages are inserted into each input stream is configurable, the amount of data required to buffer message information that is needed to replay messages upon router restart may be limited according to implementation needs. Thus, the amount of data required to buffer message data may be balanced against the small amount of processing power required to generate and insert heartbeat messages into the input and output streams.

Batching Based on Publication Constraints

Message batching techniques are described hereafter that conform message batches to batch publication constraints and also to message ordering requirements within the batch, without regard to the type of messages being batched or the specifics of the publication constraints being applied. Specifically, an output array of messages is formed from messages received from a plurality of input streams, where the output array is for a particular output stream and includes messages from the plurality of input streams that match criteria associated with the particular output stream. The output array includes multiple messages from each input stream of the plurality of input streams, and within each input stream of the plurality of input streams, the messages are ordered. Accordingly, the output array is formed in a manner that preserves the ordering of the messages with respect to the respective ordering of each of the plurality of input streams.

Messages are added from a head of the output array to a current batch until addition of a next message in the output array to the current batch would violate a particular batch processing constraint imposed on the batch. According to embodiments, one or more additional messages, which follow the message that would cause the constraint violation, are added to the current batch when addition of the one or more additional messages to the batch (a) does not violate the particular batch processing constraint, and (b) continues to preserve the ordering of the messages, in the batch, with respect to the respective ordering of each of the plurality of input streams.

Embodiments may be configured to produce batches based on criteria chosen by a user, including whether a size of the batch is closest to a size constraint on the batch, whether the batch contains the largest possible number of messages, whether the batch has the most even distribution of messages among source input threads, etc.

Heartbeat Messages

FIG. 2 depicts a flowchart 200 for using heartbeat messages in input streams of an inter-stream messaging system to act as watermarks for recovery of messages from a set of output streams after a router failure, according to embodiments. Specifically, at step 202, an inter-stream router detects an input heartbeat message in a particular input stream that includes a sequence of messages, where the inter-stream router routes messages from a plurality of input streams to a plurality of output streams, and where the plurality of input streams comprises the particular input stream. For example, FIG. 3 depicts an inter-stream messaging system 300 with many components that correspond to components depicted in FIG. 1, for which the numbering indicated in FIG. 1 is preserved. The input and output streams of system 300 include heartbeat messages 302, 304, 306, 308, 312A-C, 314A-C, 316A-C, and 318A-C.

According to an embodiment, a recovery application running on a computing device automatically, and periodically, inserts heartbeat messages into each input stream of a given inter-stream messaging system. The recovery application may be router 140 or may be another distinct application. The frequency with which heartbeat messages are inserted into a given input stream is configurable, e.g., once every minute, once every second, once every two hours, etc. Configurability of inserting heartbeat messages for a given input stream allows for a balance between how much data must be recovered from the input stream upon router failure vs. how much processing power is being used to insert and sample heartbeat messages for the input stream.

Each heartbeat message includes an identifier of the input stream into which the heartbeat message was inserted. This input stream identifier may be included in the message at the time of message generation or insertion into the input stream. Further, the input stream identifier may be inserted into the output heartbeat messages generated by router 140, which are then routed to the different output streams, as described in detail below.

Each heartbeat message also includes sequence information that indicates a position of the heartbeat message in the sequence of heartbeat messages for its particular input stream. The sequence information may be a counter value that increases with each heartbeat message for a given stream, or some other sequence indicator, such a system timestamp that indicates the time that the heartbeat message was generated and inserted into the input stream. According to an embodiment, heartbeat messages include a metadata value indicating the time of heartbeat message generation. Such information can indicate, to a system undergoing recovery, how much time was lost when compared to a current system timestamp.

According to an embodiment, heartbeat messages do not carry information produced by a producer, but are used exclusively as watermarks for router failure recovery, as described in detail herein.

An example of the heartbeat message insertion process shall now be given with reference to FIG. 3. Referring to FIG. 3, the recovery application for system 300 determines that a predetermined amount of time between heartbeat message insertions, for input stream 130, has passed since inserting the latest heartbeat message into stream 130. In response, the recovery application generates heartbeat message 306 with a sequence number, "H8", that uniquely identifies the heartbeat message among all heartbeat messages inserted into input stream 130. The recovery application inserts message 306 into input stream 130 at the current tail of the input stream, which, at the time, was occupied by message 134.

When the predetermined amount of time between heartbeat messages for input stream 130 passes after inserting message 306, during which time a message producer associated with input stream 130 produced messages 136 and 138, the recovery application generates a heartbeat message 308 with a sequence number, "H9". The sequence number of message 308 indicates that message 308 is the next heartbeat message after message 306, with the identifier "H8". The recovery application inserts heartbeat message 308 into input stream 130 at the current tail of stream 130, which, at the time, was occupied by message 138. In a similar manner, the recovery application inserts, into input stream 120, heartbeat message 304, and also inserts, into input stream 110, heartbeat message 302, i.e., based on configurable periods of time to wait between inserting heartbeat messages for the different input streams.

Because the messages in input streams 110-130 are ordered, router 140 routes the messages, from each individual input stream, in the order in which the router pulls messages from the stream. To illustrate for input stream 130, router 140 routes messages 132, 134, 306, 136, 138, and then 308, in that order.

According to one or more embodiments, messages may be in any format. The attributes of a message, such as type, source input stream, message position in an ordering of messages from the source input stream, etc., may be stored in any way, including in the body of the message data, or as metadata for the message, etc.

At step 204, in response to detecting the input heartbeat message, the inter-stream router automatically sends a respective output heartbeat message, that corresponds to the input heartbeat message, to each output stream of the plurality of output streams. For example, after routing messages 132 and 134 from input stream 130, router 140 pulls heartbeat message 306 from input stream 130. Router 140 determines that message 306 is a heartbeat message, e.g., based on metadata in message 306 that indicates that the message is a heartbeat message. Upon determining that message 306 is a heartbeat message, router 140 generates, and sends to each output stream 150-170, a respective output heartbeat message that corresponds to heartbeat message 306, i.e., heartbeat messages 316A-C. Because the messages in the output stream are ordered according to the respective orderings in the source input streams, the output heartbeat messages 316A-C (which correspond to heartbeat message 306) mark, in each output stream, the same "position" from input stream 130.

To illustrate, as shown in FIG. 3, heartbeat messages 316A (in output stream 150), 316B (in output stream 160), and 316C (in output stream 170) all correspond to message 306 in that they indicate the same combination of heartbeat message identifier ("H8") and input stream identifier ("130") as message 306. In output stream 160, heartbeat message 316B is ordered after output message 162 (which corresponds to input message 132), and, in output stream 170, heartbeat message 316C is ordered after output message 172 (which corresponds to input message 134). Because output stream 150 does not include any output messages that correspond to messages depicted in input stream 130, other than heartbeat messages, the position of heartbeat message 316A in output stream 150 may be placed at any position that precedes heartbeat message 318A in the stream. In the example of system 300, heartbeat message 316A is located at the head of output stream 150.

Similarly, router 140 generates, and sends to all output streams 150-170, output heartbeat messages corresponding to each of input heartbeat messages 302, 304, and 308 (i.e., heartbeat messages 312A-C, 314A-C, and 318A-C, respectively).

Heartbeat Message Store

At step 206, it is determined that a particular output heartbeat message, that corresponds to the input heartbeat message, was processed from a particular output stream of the plurality of output streams. For example, FIG. 4 depicts batches 402, 404, and 406 of messages that have been processed from each of the output streams 150-170, respectively. In the example of FIG. 4, batch 402 includes messages 314A, 318A, 154, 152, and 316A; batch 404 includes messages 166, 316B, 164, and 162; and batch 406 includes messages 176, 174, 316C, and 172. As an example of message processing, the messages in each of batches 402-406 have been published, by a respective publishing consumer that publishes messages from the associated output stream, to one or more systems that take action based on the messages.

After batches 402-406 have been processed, the recovery application determines that heartbeat messages 314A, 318A, and 316A-C, from those batches, have been processed. For example, the recovery application comprises a listener that detects which heartbeat messages are included in a given batch, and then detects that the given batch has been processed. In this example embodiment, the recovery application determines that a particular heartbeat message was processed based on the listener detections.

According to an embodiment, a heartbeat message is processed in the same way as messages that are generated by producers that produce substantive messages for the system. In this embodiment, the consumers reject the heartbeat messages being processed from output streams as irrelevant because they do not contain substantive messages for the consumers. The resources required to process heartbeat messages in this way are small, and do not outweigh the storage and processing power gains resulting from failure recovery, according to embodiments. According to an embodiment, heartbeat messages are processed by discarding them upon successful processing of the batch in which the heartbeat messages are included.

At step 208, in response to determining that the particular output heartbeat message was processed from the particular output stream, information from the particular output heartbeat message is recorded in a heartbeat store in connection with the particular output stream. For example, when a heartbeat message is processed from a given output stream, the recovery application records information for the heartbeat message, in a heartbeat store, in connection with both the output stream and the input stream that is the source of the heartbeat message.

FIG. 5 depicts an example heartbeat store 500 that reflects the heartbeat messages that have been processed as part of batches 402-406 indicated in FIG. 4. Specifically, heartbeat store 500 includes one row for each input stream 110-130 (i.e., rows 502-506), and a column for each output stream 150-170 (i.e., columns 512-516). The cell corresponding to a given row/column combination indicates the latest heartbeat message, from the indicated input stream, which has been processed from the indicated output stream.

As indicated in FIG. 4, none of heartbeat messages 312A-C ("H5"), corresponding to heartbeat message 302 from input stream 110, have been processed. Thus, row 502, corresponding to input stream 110, indicates that the heartbeat message that was inserted into stream 110 before heartbeat message 302, i.e., "H4" (not indicated in FIG. 4), was the latest heartbeat message from stream 110 to be processed from each of the output streams 150-170.

Furthermore, since message 314A ("H20") was processed from output stream 150, column 512 of row 504 indicates that "H20" is the latest heartbeat message, sourced from input stream 120, that was processed from output stream 150. However, messages 314B and 314C have not yet been processed from output streams 160 and 170. Thus, columns 514 and 516 of row 504 indicate that the heartbeat message that was inserted into stream 120 before heartbeat message 304, i.e., "H19" (not shown in FIG. 4), was the latest heartbeat message, sourced from stream 120, to be processed from output streams 160 and 170.

From input stream 130, heartbeat messages 316A, 316B, 316C, and 318A were all processed from output streams 150-170 in batches 402-406 indicated in FIG. 4. Though both messages 316A and 318A were processed from output stream 150, only the latest heartbeat message from input stream 130 processed from output stream 150 is indicated in heartbeat store 500, i.e., "H9" in column 512 of row 506. Columns 514 and 516 of row 506 indicate that "H8" is the latest heartbeat message (i.e., messages 318B and 318C) sourced from input stream 130 to be processed from output streams 160 and 170.

Recovery from Inter-stream Router Failure

While routing messages between input and output streams, an inter-stream router may fail, which causes the loss of any message that are not part of a message batch that has been processed from the output streams. For example, after the messages of batches 402-406, indicated in FIG. 4, have been processed from output streams 150-170, and while the unprocessed messages indicated in output streams 150-170 in FIG. 4 are associated with those streams, router 140 experiences a failure that requires restarting the router. Upon restarting the router, all information maintained by router 140 about which messages have been processed, and which messages have been allocated to particular output streams, is lost.

According to an embodiment, steps 210 and 212 are performed after a failure of the inter-stream router (e.g., router 140). At step 210, a target input heartbeat message is selected based on information in the heartbeat store. For example, after router 140 has had a failure, the recovery application selects a target heartbeat message for each input stream of system 300 based on the information in heartbeat store 500. The target heartbeat message for each input stream provides a watermark for recovering messages that were lost and not published from the input stream.

Selecting the target input heartbeat message for a given input stream comprises the recovery application automatically identifying the latest heartbeat message, from the input stream, that is recorded in the heartbeat store for all output streams of the plurality of output streams. To illustrate, heartbeat store 500 of FIG. 5 indicates that, for input stream 130, heartbeat message "H9" was processed from output stream 150, but the latest heartbeat message processed from output streams 160 and 170 was "H8". Thus, the recovery application determines that the target heartbeat message for input stream 130 is "H8", because it is the latest heartbeat message that was processed from all of the output streams. The heartbeat message "H9" is not selected as the target heartbeat message for input stream 130 because the output heartbeat messages for "H9" have not yet been processed from all of the output streams, as indicated in heartbeat store 500. In a similar manner, the recovery application determines that the target heartbeat message for input stream 110 is "H4", and that the target heartbeat message for input stream 120 is "H19".

The target heartbeat message for a given input stream indicates a point within the input stream before which all messages have been processed from all output streams. As such, the recovery application need only cause router 140 to initiate routing messages from the given input stream starting immediately after the target heartbeat message. Accordingly, at step 212, messages are automatically recovered, from the particular input stream, that are after the target input heartbeat message in the sequence of messages. For example, after router 140 restarts, router 140 initiates routing messages, for input stream 130, from heartbeat message 308 ("H8"). Similarly, after router 140 restarts, router 140 initiates routing messages, for input stream 110, from heartbeat message "H4", and, for input stream 120, from heartbeat message "H19".

According to an embodiment, in order to maintain information for messages that are potentially needed for recovery, the recovery application stores, for each input stream in a data recovery store, messages that precede the latest heartbeat message of the respective input stream processed from all of the output streams. For example, as router 140 routes each of the messages in input stream 120, the recovery application stores information for each of the routed messages in a data recovery store, including data from messages 122, 124, 304, 126, and 128. When the recovery application records that heartbeat message "H20" has been processed from all of the output streams 150-170, the recovery application automatically discards all message data, from the data recovery store, that records messages that precede heartbeat message 304 ("H20") in input stream 120. In this case, upon determining that heartbeat message "H20" was processed from all of the output streams, the recovery application discards data for messages 122, 124, and 304 from the data recovery store.

Thus, embodiments persist a minimum of data for purposes of failure recovery, since embodiments keep track of which messages would be needed to perform failure recovery at any given time. Further, because the recovery is based on the heartbeat message, there is no need to query the data recovery store in order to determine at what point replay of messages should begin upon failure recovery.

According to embodiments, recovery from router failure using heartbeat message as watermarks may cause some messages to be duplicated. For example, as depicted in FIG. 4, "D4" represented by message 176 was included in batch 406, and was processed as part of that batch. However, the input message 136 that represents "D4" is ordered, in input stream 130, after heartbeat message 306 ("H8") and before heartbeat message 308 ("H9"). Thus, if there is a router failure after batch 406 is processed, but before heartbeat messages 318A-C ("H9") are all processed from output streams 150-170, then a duplicate of message 136 will be re-routed by router 140 during failure recovery. However, according to an embodiment, message consumers are tolerant to duplicate messages. Thus, duplicate messages being sent out to the output streams does not adversely affect consumer functionality.

Batching Messages for Publication

According to an embodiment, messages are processed from output streams by publishing the messages, which makes the messages available to one or more consumer services that act on the messages. In this embodiment, messages from each output stream may be published independently of messages from the other output streams, such as by one or more message publication technologies that include Amazon Kinesis, Kafka, socket, API, etc.

Many publishing technologies have some constraints, limitations, and/or preferred configurations that restrict the way that messages are published thereby. For example, many publishing technologies constrain the amount of data that may be published in a given period of time, and also constrain the number of messages that may be published in a given period of time. These are non-limiting examples of publishing constraints, and other kinds of constraints may be imposed.

For example, messages in output stream 170 are of type JSON, and the messages are processed from output stream 170 by an API publication service, which utilizes HTTP. The API publication service enforces the following constraints on publication from output stream 170: the throughput is constrained to a maximum of 5 MB per minute, and the number of messages being published is constrained to a maximum of 5 posts per minute. As a further example, messages in output stream 150 are composed of binary data, and the messages are processed from output stream 150 by an Amazon Kinesis publication service, which utilizes RPC. The Amazon Kinesis publication service enforces the following constraints on publication from output stream 150: the throughput is constrained to a maximum of 1 MB per second, and the number of messages being published is constrained to a maximum of 1000 messages per second.

These examples are non-limiting, and any kind of time period or constraint may be applied by publishing services. Constraints may involve restrictions based on one or more of: a time window (of second, minutes, etc.); throughput; a number of writes/reads per time window; data format (XML, JSON, Avro, protocol buffers, etc.); data encoding (such as base64, Avro, etc.); data flow attributes, such as an order of bytes, or content of packets, or headers, etc.

Because of publishing constraints, publishing individual messages may cause a constraint on the number of messages that may be published to toll before the maximum allowed throughput of publishing is achieved, which results in inefficient utilization of available bandwidth. However, such issues resulting from publishing constraints may be managed by batching messages, e.g., batches 402-406 of FIG. 4, where each batch of messages is published as a single message thereby causing only one message count for purposes of publication. In this way, the size of batches may be configured to maximize the amount of data being published while avoiding contravening constraints on the number of allowed messages.

Given the benefits of message batching, some publishing technologies, such as Amazon Kinesis, expose libraries that facilitate message batching. However, these batching algorithms organize messages into batches without regard to message ordering. Specifically, the batching technologies maximize throughput by fitting messages into batches based on message size, which generally results in scrambling of the original ordering of the messages. Thus, such batching systems are not utilized in inter-stream messaging systems (such as financial systems) that require ordering of messages. Because it is difficult to fully utilize the allowed bandwidth of publishing systems without batching outgoing messages, systems that require ordered publication of messages generally suffer from inefficient utilization of publication bandwidth.

Preserving the Ordering of Messages in Publication Batches

Thus, embodiments provide a batching system that conforms message batches to batch publication constraints and also to message ordering requirements within the batch, without regard to the type of messages being batched or the specifics of the publication constraints being applied. Specifically, FIG. 6 depicts a flowchart 600 for batching messages in order to efficiently satisfy batch processing constraints as well as message ordering requirements, according to embodiments. Flowchart 600 is described herein in connection with inter-stream messaging systems, as described above. However, embodiments are applicable to any batching that is required to conform to data flow constraints and also to message ordering requirements.

At step 602, an output array of messages is formed from messages received from a plurality of input streams, where the output array is for a particular output stream and includes messages from the plurality of input streams that match criteria associated with the particular output stream, where the output array includes multiple messages from each input stream of the plurality of input streams, where, within each input stream of the plurality of input streams, the messages are ordered, and where the output array is formed in a manner that preserves the ordering of the messages with respect to the respective ordering of each of the plurality of input streams. According to embodiments, an array of messages is implemented in any way, including by a queue data structure, a ring buffer data structure (as is used in the Disruptor router, described in further detail below), an in-memory array data structure, etc.

Figure 7A:
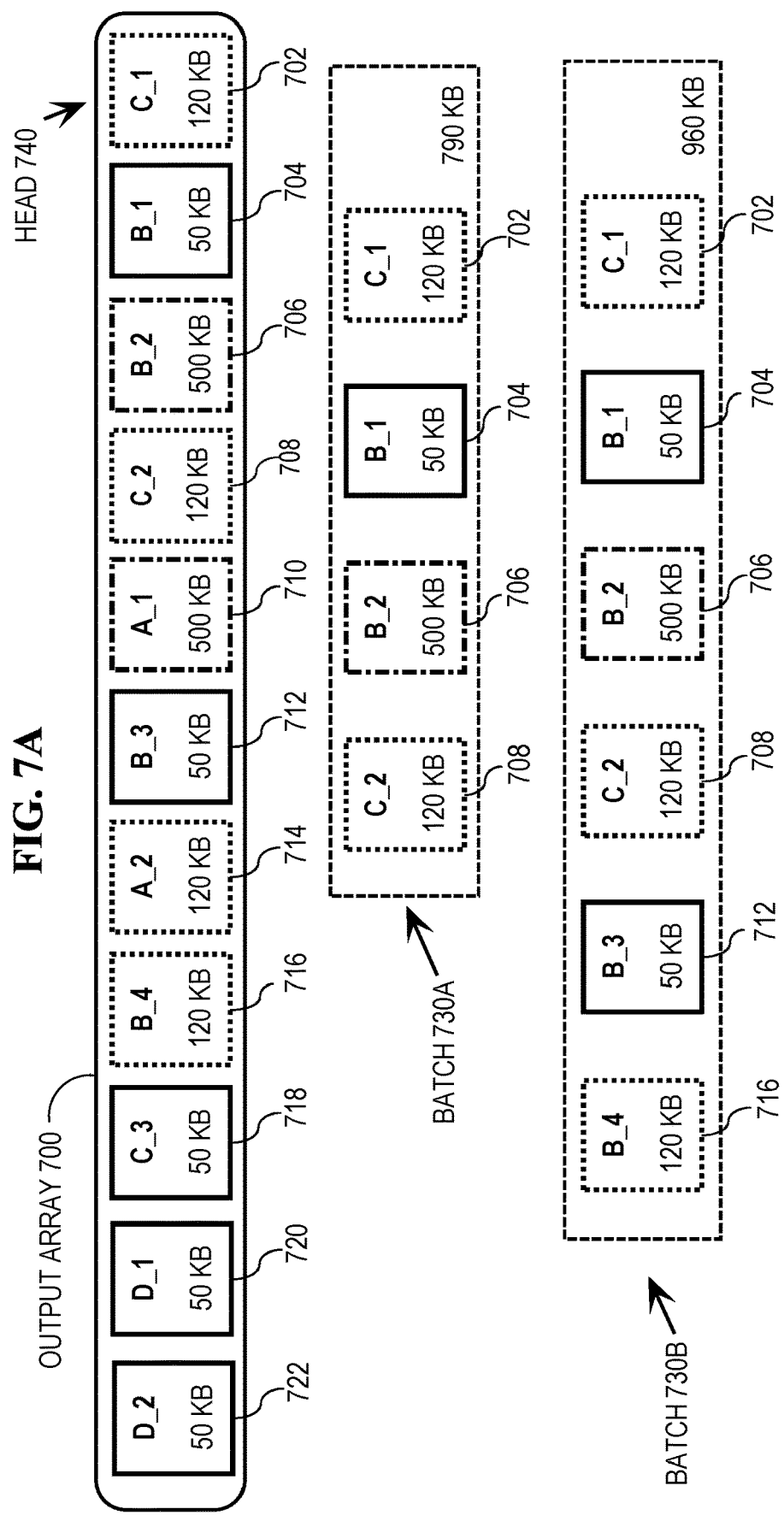
FIGS. 7A-B depict an example output array that stores messages for an ordered output stream, and also batches of messages generated from the output stream.

To illustrate step 602, FIG. 7A depicts an example output array 700 that stores messages for an ordered output stream, e.g., which was generated by an inter-stream router such as router 140 of FIG. 3. Specifically, according to this example, router 140 routes messages from input streams A, B, C, and D into the output stream. Input streams A-D are similar in characteristics to input streams 110-130 described above, and the output stream corresponding to output array 700 is similar in characteristics to any of output streams 150-170 described above. According to an embodiment, router 140 routes messages, from input streams A-D, to output array 700 based on the type of the messages matching a type associated with the corresponding output stream.

Output array 700 stores an ordered list of messages that have been routed to the associated output stream, where the ordering in array 700 preserves the ordering of the messages with respect to ordering of each of input streams A-D. Specifically, as depicted in FIG. 7A, the messages in array 700 are labeled the respective source input streams ("A", "B", "C", or "D"). Accordingly, messages 710 and 714 are from input stream A; messages 704, 706, 712, and 716 are from input stream B; messages 702, 708, and 718 are from input stream C; and messages 720 and 722 are from input stream D. The messages from each stream are further labeled, as a suffix to the input stream label, with the relative position of the message in the source input stream. To illustrate, messages 704, 706, 712, and 716 from input stream B were included in the stream in that order (from least-recently inserted to most-recently inserted). This ordering from the source input stream is preserved in array 700. As shown, messages from one or more other input streams may be interleaved into the messages from input stream B without affecting the preservation of the ordering of the messages from the source input stream.

At step 604, messages are added from a head of the output array to a batch until addition of a next message in the output array to the batch would violate a particular batch processing constraint. For example, the messages in array 700 are processed by a publishing service that subjects the message publication to multiple processing constraints, including restriction of publication throughput to a maximum of 1 MB of data per second, and restriction of the number of messages being published to a maximum of 5 per second.

A batching application, which may be implemented as part of router 140, adds messages from a head 740 of array 700 to a batch until a next message in the array would cause the batch to violate a batch processing constraint imposed by the publishing service were the batch to be published. Adding messages from head 740 of the array maintains the ordering of the messages from the source input streams because the source input stream ordering is preserved in the sequence of messages in the array 700.

Figure 7B:
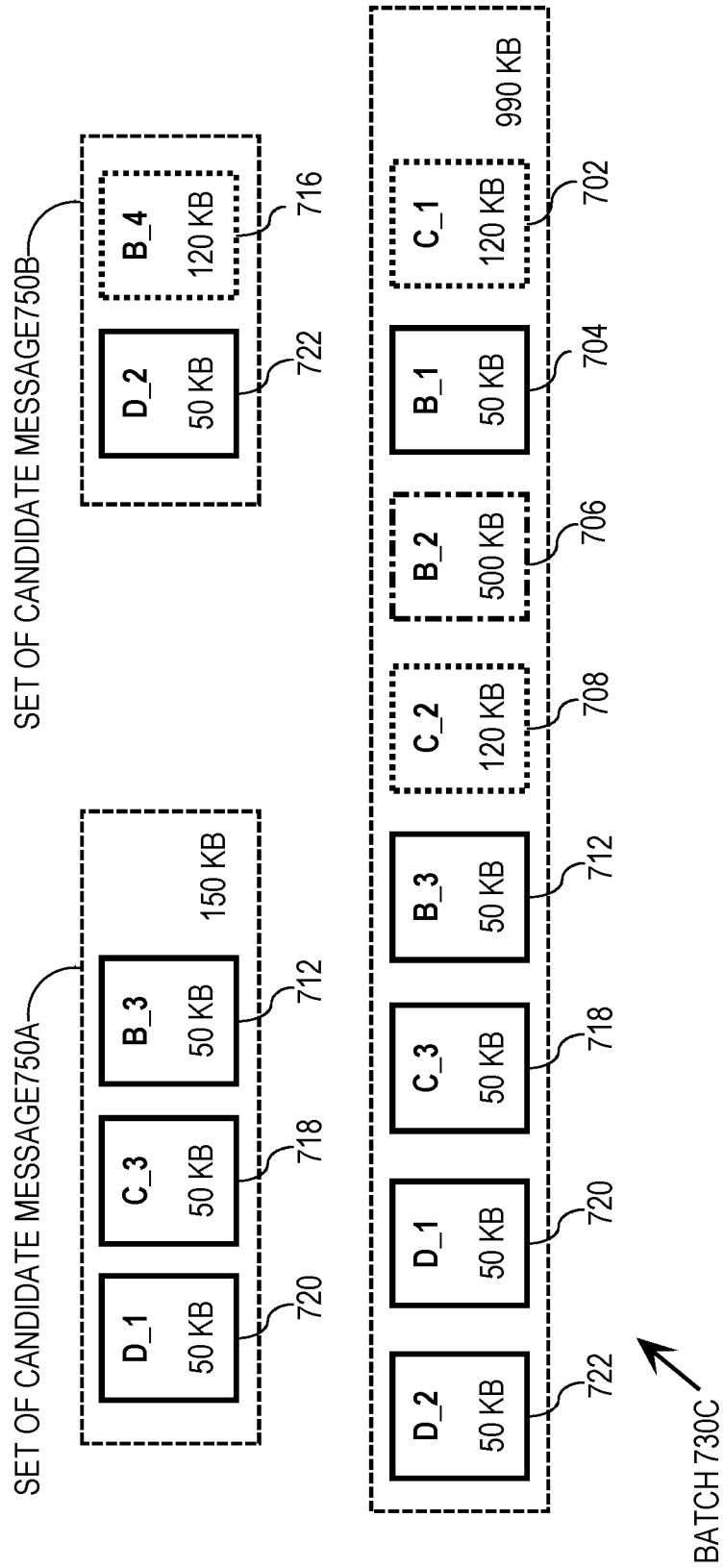

To illustrate, FIGS. 7A-B depict batches 730A-C generated from messages in output array 700, including a batch 730A that includes messages 702-708 from head 740 of array 700. As indicated in FIG. 7A, messages 702 and 708 are 120 KB in size, message 704 is 50 KB in size, and message 706 is 500 KB in size, which gives a total of 790 KB in batch 730A. The next message in array 700, message 710, is not included in batch 730A because inclusion of message 710 would cause the size of the batch to exceed 1 MB.

At step 606, the batch is processed as part of the particular output stream. For example, the batching application determines that one or more applicable publishing constraints allow publication of additional data. To illustrate given the example constraint of 1 MB per second, the batching application determines that it has been at least one second since publication of a previous batch of messages that was large enough to constrain further data publication for one second. In response to determining that a publication of 1 MB of data is allowable based on the applicable publication constraints, the batching application causes batch 730A to be published, as a single message, by the publishing service without addition of any other message to the batch.

In this embodiment of batch construction, messages 710-722 in array 700 are processed in a different batch. While batch 730A could include additional messages from array 700 while still conforming to the batch processing constraint, it may be advantageous to process batch 730A without adding further messages. For example, pulling messages from the head of the output array without further scanning for additional messages is relatively inexpensive. The applicable batch processing constraints allow up to five messages per second, and it may be most efficient to generate multiple (five or less) batches that jointly utilize the maximum throughput, where each batch is constructed using the least amount of processing power necessary to form a batch.

Scanning for Additional Messages to Include in a Batch

According to another embodiment, once the batching application determines that the addition of message 710 to batch 730A would violate the batch processing constraint of 1 MB, the batching application scans for one or more additional messages in output array 700, which follow message 710, whose addition to the batch (a) would not violate any batch processing constraints, and (b) would continue to preserve the ordering of the messages in the batch with respect to the respective ordering of each of the source input streams.

According to an embodiment, the batching application scans array 700 to identify additional messages to add to batch 730A by evaluating each message subsequent to message 710, in order, to determine whether addition of the respective message to the current batch would violate any batch processing constraints. To illustrate, after determining that addition of message 710 to batch 730A would cause the batch to exceed 1 MB in size, the batching application begins evaluation of messages at message 712, which is the next message after message 710. The batching application determines that addition of message 712 to the current batch would bring the total size of the batch to 840 KB and, as such, adds message 712 to the batch (see batch 730B).

According to an embodiment, the batching application identifies one or more excluded input streams of the plurality of input streams of the system, where each of the one or more excluded input streams is the source of a message that has been excluded from the batch, and excludes messages from the one or more excluded input streams from the batch. For example, the batching application determines that the next message after message 712, message 714, is from the same input stream as excluded message 710. As such, the batching application automatically excludes message 714 from the batch.

The batching application then evaluates message 716 to determine whether addition of the message would cause batch 730 to exceed 1 MB in size. Because message 716 is 120 KB, and addition of message 716 to the current batch would bring the total size of the batch to 960 KB, the batching application adds message 716 to the batch (see batch 730B).

Furthermore, because no other messages in output array 700 are small enough (40 KB or less) to add to batch 730B without violating the batch processing constraint, the batching application adds no additional messages to batch 730B prior to the batch being processed. Messages 710, 714, 718, 720, and 722 are left in array 700 to be processed as part of a different batch. Specifically, after processing of batch 730B, output array 700 includes, at head 740, message 710, then message 714, then message 718, and then messages 720 and 722. After these messages, array 700 would include any further messages routed to the corresponding output stream.

Sets of Candidate Messages

According to an embodiment, the batching application scans the output array to identify additional messages to add to batch 730A by compiling one or more sets of candidate messages, where a set of candidate messages comprises messages from the output stream that immediately follow a message, included in the current batch, according to the ordering of messages of the source input stream. Filling a batch of messages from one or more sets of candidate messages has the advantage of equalizing the processing time given to the input streams in any given batch. This equalization could be helpful in a system with input streams that output similar amounts of data over time, especially where a particular input stream might be disadvantaged by a lag in processing of its messages.

To illustrate, FIG. 7B depicts candidate sets of messages 750A-B. After compiling a preliminary batch 730A as described above, the batching application identifies a first set of candidate messages 750A from output array 700, each message of which immediately follows a respective message, in batch 730A, according to the ordering of messages in the source input stream. Specifically, set of candidate messages 750A includes a "next" message from each of input streams B, C, and D, as explained below. No message from input stream A is included in the sets of candidate messages because message 710 that was excluded from preliminary batch 730A was from input stream A.

To determine the "next" message from input stream B, the batching application determines that the "last" message from input stream B in preliminary batch 730A is message 706 ("B_2"), and, as such, the "next" message from input stream B in array 700 is message 712 ("B_3"). Thus, the batching application includes message 712 in the set of candidate messages 750A. The batching application determines that the "last" message from input stream C in preliminary batch 730A is message 708 ("C_2"). As such, the "next" message from input stream C in array 700 is message 718 ("C_3"). Thus, the batching application includes message 718 in the set of candidate messages 750A. No messages from input stream D have yet been included in preliminary batch 730A. As such, the "next" message from input stream D in array 700 is message 720 ("D_1), which the batching application also includes in the set of candidate messages 750A.

According to an embodiment, the batching application adds as many of the messages in the set of candidate messages 750A to the current batch as possible given applicable batch processing constraints. According to the example above, because the total size of the set of candidate messages 750A is 150 KB, and the total size of batch 730A is 790 KB, the batching application automatically adds all of the set of candidate messages 750A to the current batch (as shown in batch 730C), which brings the total size of the current batch to 940 KB.

According to an embodiment, the batching application forms a second set of candidate messages 750B in a manner similar to the construction of the set of candidate messages 750A. Specifically, the set of candidate messages 750B includes a "next" message for all input streams that have not yet been excluded from the current batch. Because no messages from the set of candidate messages 750A were excluded from the current batch, only messages from input stream A are excluded from the set of candidate messages 750B based on exclusion of message 710 ("A_1") from preliminary batch 730A.

Specifically, the set of candidate messages 750B includes message 716 ("B_4"), and message 722 ("D_2"). There are no other messages from input stream C in array 700, so no message from input stream C is included in the set of candidate messages 750B. Because addition of message 716 (size 120 KB) would cause the batch to exceed 1 MB, the batching application excludes this message from the current batch. However, the batching application determines that message 722 (size 50 KB) fits in batch 730C, and, accordingly, the batching application adds message 722 to batch 730C, bringing the size of batch 730C to 990 KB.

According to an embodiment, because no other messages in output array 700 are small enough (10 KB or less) to add to batch 730C without violating the batch processing constraint of 1 MB per second, the batching application adds no more messages to batch 730C prior to the batch being processed. Thus, after processing of batch 730C, output array 700 includes, at head 740, message 710, and then messages 714 and 716. After these messages, array 700 would include any further messages routed to the corresponding output stream from the input streams.

At times, a set of candidate messages includes multiple messages that could be added to the current batch, but which cannot all be added to the current batch based on processing constraints. According embodiments, the batching application chooses which of the multiple candidate messages, in a set of candidate messages, to add to the current batch based on one or more of: maximizing or minimizing the number of messages in the batch, maximizing the size of the batch within the size constraint, evenly distributing processing of messages among input streams, etc. This criteria is configurable by a user.

Furthermore, according to an embodiment, the batching application ceases scanning output array 700 for additional messages to add to a current batch upon determining that a minimum amount of time has passed since publishing the allowable amount of data during that amount of time. The current batch is caused to be processed without completing the scan for additional messages in order to utilize the available publication bandwidth as quickly and efficiently as possible. According to an embodiment, the batching application automatically determines the amount of data that may still be processed during the allotted time amount, based on the processing constraints, and creates a second batch with a target size configured to maximize the publication throughput.

According to an embodiment, the batching application runs multiple different kinds of batching techniques on the contents of output array 700 to determine which batching mechanism is more effective. The criteria for most effective batching mechanism is the mechanism that produces a batch, from the output array, that: has a size that is closest to a size constraint on the batch, contains the most number of messages, has the most even distribution of messages among the input threads, or any combination of these criteria. The batch generated from the most effective batching mechanism is caused to be processed. The criteria for most effective batching mechanism used by the batching application is configurable by a user.

The examples discussed herein are simplified for the sake of explanation. However, any number of input streams may feed into any number of output streams, and the complexity of assembling batches greatly increases as the number and variety of messages increases.

Compression and Checksums

According to an embodiment, the recovery application also pushes another type of heartbeat event, of type TIMEOUT, into one or more of the input streams according to a configurable schedule. According to an embodiment that utilizes a ring buffer, when router 140 processes a heartbeat event of type TIMEOUT, router 140 automatically flushes the ring buffer. Heartbeat events that are of the type TIMEOUT allows a complex system to deal with network latency that may cause standard heartbeat messages to arrive at router 140 with increasing latency.

According to an embodiment, system accuracy is preserved by calculating a checksum, e.g., using the CRC32 algorithm, of event content or batch content to prevent data loss or data corruption. For example, before at the time that any given message is pushed into an input stream, embodiments calculate a checksum on the message data and store the checksum value as a metadata attribute. When the message is consumed from an output stream, the checksum for the message is calculated again, and the resulting value is compared to the checksum value stored as a metadata attribute for the message. This comparison is used as a gauge of data loss from messages inserted into the system.

Multi-Stream Messaging System Overview

An inter-stream messaging system may be implemented by one or more computing devices that facilitate the communication of messages, or message records, between input and output streams. The data structures that support the inter-stream messaging system may be configured in any way. For example, an inter-stream messaging system is implemented by one or more queues, where a plurality of input streams populate the one or more queues, and consumers pull messages for the output streams from one or more partitions/shards of the queues.

As another example, an inter-stream messaging system is implemented by a Disruptor router, which utilizes a ring buffer data structure to store/transmit messages. As described in the document "Disruptor: High performance alternative to bounded queues for exchanging data between concurrent threads" by Thompson, et al., published May 2011. Enterprise standard where performance matters along with concurrency An application (such as router 140, the batching application, or the recovery application) runs on a computing device and comprises a combination of software and allocation of resources from the computing device. Specifically, an application is a combination of integrated software components and an allocation of computational resources, such as memory, and/or processes on the computing device for executing the integrated software components on a processor, the combination of the software and computational resources being dedicated to performing the stated functions of the application.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
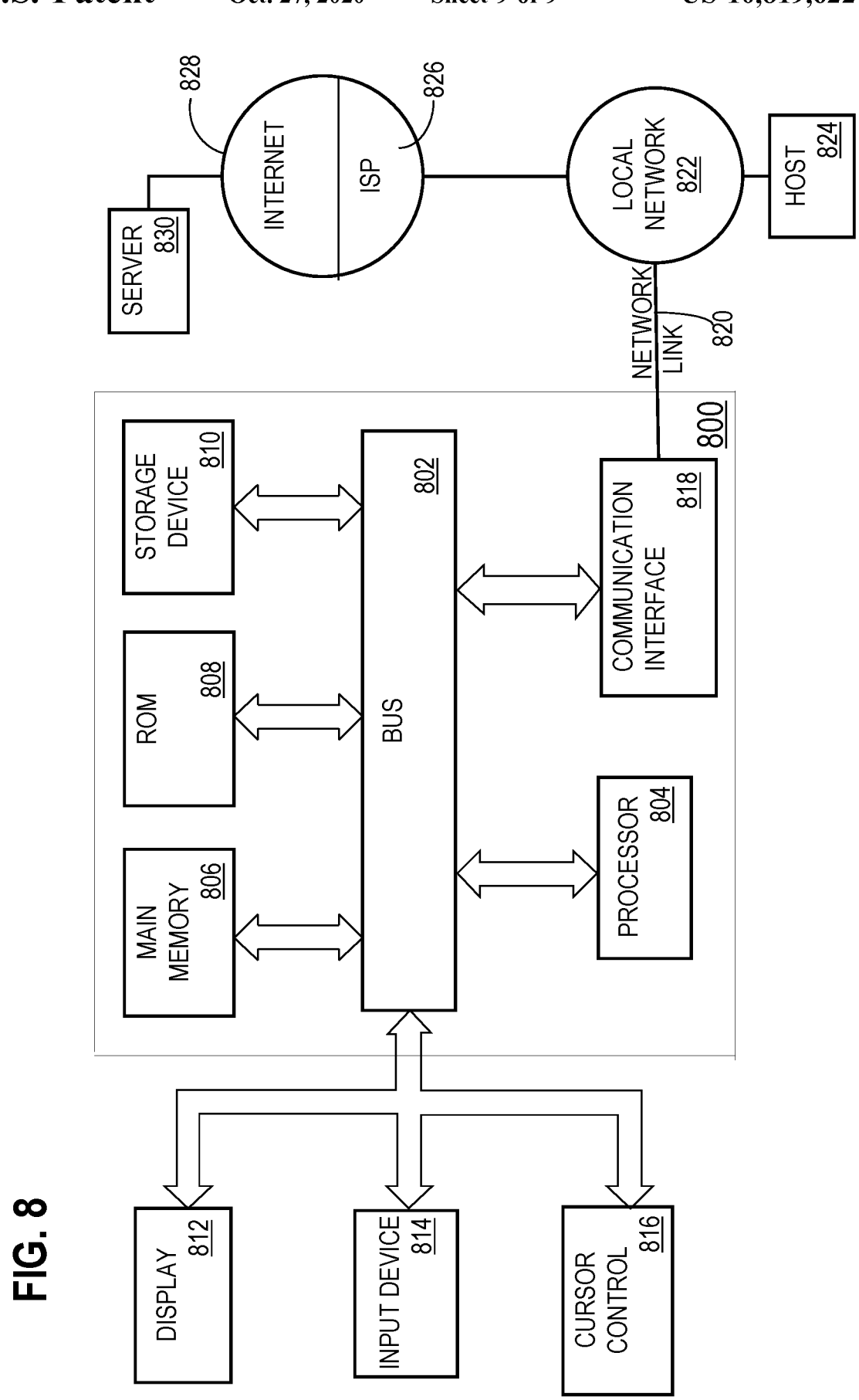
FIG. 8 depicts a computer system that may be used in an embodiment.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or solid-state drive is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 810. Volatile media includes dynamic memory, such as main memory 806. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid-state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DBaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-executed method comprising:
   an inter-stream router routing messages from a plurality of input streams to a plurality of output streams;
   wherein the plurality of input streams comprises a particular input stream;
   wherein the particular input stream comprises a sequence of messages;
   the inter-stream router detecting an input heartbeat message in the particular input stream;
   in response to detecting the input heartbeat message, the inter-stream router automatically sending a respective output heartbeat message, that corresponds to the input heartbeat message, to each output stream of the plurality of output streams;
   determining that a particular output heartbeat message, that corresponds to the input heartbeat message, was processed from a particular output stream of the plurality of output streams;
   in response to determining that the particular output heartbeat message was processed from the particular output stream, recording, in a heartbeat store, information from the particular output heartbeat message in connection with the particular output stream;
   after a failure of the inter-stream router:
      selecting a target input heartbeat message based on information in the heartbeat store, and
      automatically recovering messages, from the particular input stream, that are after the target input heartbeat message in the sequence of messages;
   wherein the method is performed by one or more computing devices.

2. The computer-executed method of claim 1, wherein:
   the particular input stream includes a plurality of ordered heartbeat messages that includes the input heartbeat message;
   each heartbeat message, of the plurality of ordered heartbeat messages, is associated with a heartbeat identifier that identifies a position, of the respective heartbeat message, within the ordering of the plurality of ordered heartbeat messages; and
   the information, in the heartbeat store, that is recorded from the particular output heartbeat message in connection with the particular output stream comprises information identifying the particular input stream, and a particular heartbeat identifier from the input heartbeat message that corresponds to the particular output heartbeat message.

3. The computer-executed method of claim 2, wherein selecting the target input heartbeat message comprises:
   based, at least in part, on heartbeat identifiers stored in the heartbeat store, determining that the input heartbeat message is a latest heartbeat message, from the particular input stream, that is recorded in the heartbeat store in connection with all output streams of the plurality of output streams; and
   in response to determining that the input heartbeat message is the latest heartbeat message, from the particular input stream, that is recorded in the heartbeat store in connection with all output streams of the plurality of output streams, selecting the input heartbeat message to be the target input heartbeat message.

4. The computer-executed method of claim 1 further comprising, prior to the inter-stream router detecting the input heartbeat message in the particular input stream:
   determining that a predetermined amount of time has past since inserting a heartbeat message into the particular input stream; and
   in response to determining that the predetermined amount of time has past since inserting a heartbeat message into the particular input stream:
      generating the input heartbeat message; and
      inserting the input heartbeat message into the particular input stream at a tail of the particular input stream.

5. The computer-executed method of claim 4 further comprising identifying, within configuration information, the predetermined amount of time based on the predetermined amount of time being associated with the particular input stream in the configuration information.

6. The computer-executed method of claim 1 further comprising:
   determining that a second output heartbeat message, that corresponds to a second input heartbeat message from the particular input stream, was processed from the particular output stream; and
   in response to determining that the second output heartbeat message was processed from the particular output stream, recording, in the heartbeat store, information from the second output heartbeat message in connection with the particular output stream;
   wherein the information from the second output heartbeat message replaces, in the heartbeat store, the information from the particular output heartbeat message.

7. The computer-executed method of claim 1 further comprising:
   the inter-stream router forming an output array of messages from messages received from the plurality of input streams;
   wherein the output array is for the particular output stream, and includes messages from the plurality of input streams that match criteria associated with the particular output stream;
   wherein the output array is formed in a manner that preserves the ordering of the messages in the output array with respect to the respective ordering of each of the plurality of input streams; and
   prior to determining that the particular output heartbeat message was processed from the particular output stream:
      adding messages, including the particular output heartbeat message, from a head of the output array to a batch, and
      processing the batch as part of the particular output stream.

8. The computer-executed method of claim 7 wherein adding messages, including the particular output heartbeat message, from the head of the output array to the batch comprises adding messages, from the head of the output array, to the batch until addition of a next message in the output array to the batch would violate a particular batch processing constraint.

9. The computer-executed method of claim 7 wherein determining that the particular output heartbeat message was processed from the particular output stream comprises:
   detecting that the particular output heartbeat message was included in the batch; and
   after detecting that the particular output heartbeat message was included in the batch, detecting that the batch was processed.

10. One or more non-transitory computer-readable media storing one or more sequences of instructions that, when executed by one or more processors, cause:
   an inter-stream router detecting an input heartbeat message in a particular input stream that includes a sequence of messages;
   wherein the inter-stream router routes messages from a plurality of input streams to a plurality of output streams;
   wherein the plurality of input streams comprises the particular input stream;
   in response to detecting the input heartbeat message, the inter-stream router automatically sending a respective output heartbeat message, that corresponds to the input heartbeat message, to each output stream of the plurality of output streams;
   determining that a particular output heartbeat message, that corresponds to the input heartbeat message, was processed from a particular output stream of the plurality of output streams;
   in response to determining that the particular output heartbeat message was processed from the particular output stream, recording, in a heartbeat store, information from the particular output heartbeat message in connection with the particular output stream;
   after a failure of the inter-stream router:
      selecting a target input heartbeat message based on information in the heartbeat store, and
      automatically recovering messages, from the particular input stream, that are after the target input heartbeat message in the sequence of messages.

11. The one or more non-transitory computer-readable media of claim 10, wherein:
   the particular input stream includes a plurality of ordered heartbeat messages that includes the input heartbeat message;
   each heartbeat message, of the plurality of ordered heartbeat messages, is associated with a heartbeat identifier that identifies a position, of the respective heartbeat message, within the ordering of the plurality of ordered heartbeat messages; and
   the information, in the heartbeat store, that is recorded from the particular output heartbeat message in connection with the particular output stream comprises information identifying the particular input stream, and a particular heartbeat identifier from the input heartbeat message that corresponds to the particular output heartbeat message.

12. The one or more non-transitory computer-readable media of claim 11, wherein selecting the target input heartbeat message comprises:
   based, at least in part, on heartbeat identifiers stored in the heartbeat store, determining that the input heartbeat message is a latest heartbeat message, from the particular input stream, that is recorded in the heartbeat store in connection with all output streams of the plurality of output streams; and
   in response to determining that the input heartbeat message is the latest heartbeat message, from the particular input stream, that is recorded in the heartbeat store in connection with all output streams of the plurality of output streams, selecting the input heartbeat message to be the target input heartbeat message.

13. The one or more non-transitory computer-readable media of claim 10, wherein the one or more sequences of instructions further comprise instructions that, when executed by one or more processors, cause, prior to the inter-stream router detecting the input heartbeat message in the particular input stream:
   determining that a predetermined amount of time has past since inserting a heartbeat message into the particular input stream; and
   in response to determining that the predetermined amount of time has past since inserting a heartbeat message into the particular input stream:
      generating the input heartbeat message; and
      inserting the input heartbeat message into the particular input stream at a tail of the particular input stream.

14. The one or more non-transitory computer-readable media of claim 13, wherein the one or more sequences of instructions further comprise instructions that, when executed by one or more processors, cause identifying, within configuration information, the predetermined amount of time based on the predetermined amount of time being associated with the particular input stream in the configuration information.

15. The one or more non-transitory computer-readable media of claim 10, wherein the one or more sequences of instructions further comprise instructions that, when executed by one or more processors, cause:
   determining that a second output heartbeat message, that corresponds to a second input heartbeat message from the particular input stream, was processed from the particular output stream; and
   in response to determining that the second output heartbeat message was processed from the particular output stream, recording, in the heartbeat store, information from the second output heartbeat message in connection with the particular output stream;
   wherein the information from the second output heartbeat message replaces, in the heartbeat store, the information from the particular output heartbeat message.

16. The one or more non-transitory computer-readable media of claim 10, wherein the one or more sequences of instructions further comprise instructions that, when executed by one or more processors, cause:
   the inter-stream router forming an output array of messages from messages received from the plurality of input streams;
   wherein the output array is for the particular output stream, and includes messages from the plurality of input streams that match criteria associated with the particular output stream;
   wherein the output array is formed in a manner that preserves the ordering of the messages in the output array with respect to the respective ordering of each of the plurality of input streams; and
   prior to determining that the particular output heartbeat message was processed from the particular output stream:
      adding messages, including the particular output heartbeat message, from a head of the output array to a batch, and
      processing the batch as part of the particular output stream.

17. The one or more non-transitory computer-readable media of claim 16 wherein adding messages, including the particular output heartbeat message, from the head of the output array to the batch comprises adding messages, from the head of the output array, to the batch until addition of a next message in the output array to the batch would violate a particular batch processing constraint.

18. The one or more non-transitory computer-readable media of claim 16 wherein determining that the particular output heartbeat message was processed from the particular output stream comprises:
   detecting that the particular output heartbeat message was included in the batch; and
   after detecting that the particular output heartbeat message was included in the batch, detecting that the batch was processed.

* * * * *